United States Patent [19]

Bravet et al.

[11] Patent Number: 5,032,665

[45] Date of Patent: Jul. 16, 1991

[54] METHOD AND DEVICE FOR THE MANUFACTURE OF A HIGH OPTICAL QUALITY TRANSPARENT PLASTIC SHEET

[75] Inventors: Jean-Louis Bravet, Thourotte; Gerard Daude, Villenave D'Ornon; Noel Crux, Margy les Compiegne, all of France

[73] Assignee: Saint-Gobain Vitrage, Courbevoie, France

[21] Appl. No.: 585,287

[22] Filed: Sep. 18, 1990

Related U.S. Application Data

[63] Continuation of Ser. No. 271,010, Nov. 14, 1988, abandoned.

[30] Foreign Application Priority Data

Nov. 12, 1987 [FR] France .................................. 8715625

[51] Int. Cl.$^5$ ............................................. C08G 18/72
[52] U.S. Cl. ........................................ 528/53; 528/76; 528/80; 528/85; 528/499

[58] Field of Search ....................... 528/53, 76, 80, 85, 528/499

[56] References Cited

U.S. PATENT DOCUMENTS 4,408,034 10/1983 Kazama et al. ........................ 528/54
4,595,741 6/1986 Kamatani et al. .................... 528/53

FOREIGN PATENT DOCUMENTS 4014020 1/1988 European Pat. Off. .

Primary Examiner—John Kight, III.
Assistant Examiner—Dennis R. Daley
Attorney, Agent, or Firm—Oblon, Spivak, McClelland, Maier & Neustadt

[57] ABSTRACT

A high optical quality polyurethane layer is manufactured by reactive pouring or reactive spraying of a reaction mixture comprising an aliphatic isocyanate component and a polyol component followed by a polymerization comprising the passage of the layer through a catalytic atmosphere containing at least one tertiary amine.

15 Claims, No Drawings

METHOD AND DEVICE FOR THE MANUFACTURE OF A HIGH OPTICAL QUALITY TRANSPARENT PLASTIC SHEET

This application is a continuation Serial No. 07/271,010 filed on Nov. 14, 1988 now abandoned.

BACKGROUND OF THE INVENTION

1. Field of the Invention

The invention relates to the manufacture of a high optical quality, transparent plastic sheet which can be used alone or in combination with other materials, particularly in laminated glazings where it is combined with a monolithic or laminated glass and/or plastic support, for example vehicle windshields, with the plastic sheet comprising at least one base layer of polyurethane having energy-absorbing properties.

2. Discussion of the Background

Plastic sheets capable of being used in laminated glazings have already been proposed. French Patent No. 2,398,606 describes a sheet having two layers, which are: a layer of a thermoplastic material which, in the laminated glazing application comprising a single sheet of glass, is an intermediate layer with energy-absorbing properties, and a layer of heat-hardenable material with anti-lacerating and auto-cicatrizing properties.

The intermediate layer with energy-absorbing properties is a thermoplastic polyurethane obtained from at least one aliphatic diisocyanate and at least one polyesterdiol or polyetherdiol, with the ratio of the equivalent NCO groups to the equivalent OH groups preferably being between 0.8 and 0.9. Glazing using such a two-layer sheet retains its good optical properties and the adhesion between the components under very variable conditions of temperature and humidity, but the biomechanical properties of the glazing and, in particular, the shock-resistance are not completely satisfactory. On the other hand, the two-layer plastic sheet can be rolled and easily handled without deterioration of its optical quality.

European Patent 0 133 090 further discloses a high optical quality, transparent sheet which can be used alone or in combination with other materials, particularly in the manufacture of the laminated glazings described above. This sheet comprises a layer formed in a continuous process by the reactive pouring onto a flat horizontal support, from which it is detachable, of a reaction mixture of an isocyanate component and a component with active hydrogens, in particular a polyol component. The isocyanate component comprises at least one aliphatic or cycloaliphatic diisocyanate or a diisocyanate prepolymer, with this component having a viscosity of less than approximately 5000 centipoises at +40° C. The polyol component comprises at least one difunctional long polyol with a molecular weight of between 500 and 4000 and at least one short diol as a chain extending agent. Reactive pouring signifies pouring in the form of a layer or a film of a liquid mixture of the components in the monomeric or prepolymeric state, following by the polymerization of the mixture using heat.

Safety glazing using such a layer has good biomechanical properties under variable conditions of temperature and humidity.

The heat polymerization of the layer uses an industrial heat cycle, for example 20 minutes at a temperature of 120° C. At the end of this industrial cycle, there is not total polymerization or aging of the layer. In fact, for the reaction to be complete, a much longer polymerization heat cycle must be used than the cycles used in industrial production, which results in a very long manufacturing line or otherwise much higher temperatures must be used with all the disadvantages which such can create: high energy consumption, yellowing of the layer, etc.

Increasing the amount of catalyst in the reaction mixture could also be considered, but this would produce a premature polymerization of the mixture in the device carrying the mixture to the support and, lastly, the layer obtained is not optically homogeneous.

One of the disadvantages of incomplete polymerization is the possibility of marking the layer. When at the end of the plastic sheet manufacturing line, for reasons of stocking and ease of handling, the sheet is rolled on reels or formed into stacks, using for this purpose an intermediate film which is generally polyethylene, when the sheet is unrolled or removed from the stack before use, marks or impressions left by the intermediate film are observed on the polyurethane layer with energy-absorbing properties (more simply designated as the "EA layer").

These marks cannot subsequently be totally removed, even when the plastic sheet undergoes a heat cycle for several minutes at a temperature above 100° C., for example 10 minutes at 120° C.

To overcome this disadvantage, European Patent Application 87 401 402.0 proposes subjecting the EA polyurethane layer obtained by reactive pouring onto a flat support as described above, or also by reactive spraying, with a state of polymerization advance corresponding to an NCO/CH ratio of below 0.7, a treatment using water in liquid or vapor form and preferably, when the water is in liquid form, using hot water at a temperature above 80° C., to obtain a nil NCO/CH ratio (equal to zero). The NCO/CH ratio is the ratio between the height of the NCO peaks and the height of the CH peaks of the infrared spectrum of the EA layer upon exiting the polymerization area.

The water treatment enables the polymerization of the layer to be completed rapidly while retaining, and even improving, the mechanical properties of the layer, in particular its resistance to breakage and its stretch resistance.

When the layer is packed and/or stocked with the interposition of an intermediate layer in the form of stacked sheets, or in the form of a roll, after removal from the stack or unrolling of the layer, the layer is subjected to an adequate heat treatment, for example a cycle of at least one minute at a temperature of at least approximately 100° C.

The hot water treatment just described does not entirely remove the marking of the layer due to the contact with the intermediate film, but it is no longer a persistent marking; it can disappear during a heat treatment of the layer, following the unrolling from the spool or the removal from the stack of sheets. The subsequent heat treatment can be carried out just before the assembly with the support to form the glazing.

The treatment with water in liquid or vapor form, however, requires an assembly line which is long to permit this treatment after the layer has reached a degree of polymerization corresponding to an NCO/CH ratio of below 0.7.

SUMMARY OF THE INVENTION

Accordingly, one object of the invention is to provide a high optical quality, transparent sheet which can be rolled and easily handled without deterioration of its optical qualities.

Another object of the invention is to produce such a sheet conveniently in an industrial setting.

Yet another object of the invention is to provide a method for producing such a high optical quality, transparent sheet.

The present invention overcomes the cited disadvantages and proposes a new, rapid and economical method for the manufacture of the polyurethane-based plastic layer.

The method in accordance with the invention comprises a reactive pouring or spraying onto an adequate support of a reaction mixture of an aliphatic isocyanate component and a polyol component, which are capable of forming a transparent layer of high optical quality, and the passage of the layer formed on the support in a catalytic atmosphere containing at least one tertiary amine.

DETAILED DESCRIPTION OF THE PREFERRED EMBODIMENTS

The invention comprises a reactive pouring or spraying onto an support of a mixture of an aliphatic isocyanate component and a polyol component, which are capable of forming a transparent layer of high optical quality, and the passage of the layer formed on the support in a catalytic atmosphere containing at least one tertiary amine.

When the layer to be polymerized has a thickness above 0.1 mm, which is always the case when it must have energy-absorbing properties, the passage of the layer in the catalytic atmosphere is carried out while the layer is brought to a temperature of at least equal to 80° C.

Suitable tertiary amines for the polymerization treatment are amines which at room temperature are in the vapor state. For example, these amines are triethylamine, methyldiethylamine, dimethylethylamine or trimethylamine. Substituted amines, such as dimethylethanolamine, can also be used.

The catalytic atmosphere can be a tertiary amine-saturated atmosphere. An atmosphere formed from a mixture of air and a tertiary amine can also be used, with the concentration of the amine in the mixture in the gaseous phase being above 0.1% and preferably above 10% by volume in relation to the volume of the air-amine mixture.

The temperature of the catalytic atmosphere is preferably above 80° C.

In accordance with one embodiment of the invention, the reactive pouring or spraying is carried out on a support for the mixture, outside of the catalytic atmosphere, and the formed layer is then passed through the catalytic atmosphere to accelerating the polymerization. The passage of the layer in the catalytic atmosphere is carried out in a time t which is between 0 and 15 minutes from the time when the reaction mixture is deposited on the support.

In accordance with another embodiment of the invention, the formation of the layer itself takes place in the catalytic atmosphere, which is the one for the subsequent polymerization.

In accordance with one of the preferred embodiments of the invention, the reaction mixture intended to form the layer contains a catalyst, the action of which combines with that of the tertiary amine in vapor form. This can be a tin catalyst, for example dibutyltin dilaurate, tributyltin oxide, tin octoate, an organomercuric catalyst, for example phenylmercury propionate, an amine catalyst, for example diaza-bicyclo-(2.2.2)-octane, 1,8-diazabicyclo(5,4,0)undecene-7-tetramethyl-4-piperidyl) sebacate, or a phenolic antioxidizing agent. It can also be the tertiary amine from the catalytic atmosphere which is brought by the reaction mixture during the formation of the layer and which, through partial evaporation, will form the catalytic atmosphere in the polymerization tunnel.

The layer can also contain a sheeting agent, such as a resin, a fluoroalkyl ester or an acrylic resin.

The EA layer which can be polymerized in accordance with the invention has been described above in a general manner. The amounts of the components of the polyurethane forming the EA layer are selected preferably to obtain a stoichiometrically balanced system, that is that the ratio of the equivalent NCO groups provided by the diisocyanate component to the equivalent OH groups provided by the polyol component (both the long polyol(s) and the short diol(s)) is on the order of 1. When the NCO/OH ratio is less than 1, as it decreases, the desired mechanical properties for application in a laminated glazing rapidly become less satisfactory. When all the polyurethane components are difunctional, the lower limit of the NCO/OH ratio which provides satisfactory mechanical properties is approximately 0.9. When at least one of the components is trifunctional, this lower limit can be decreased to approximately 0.8. When the NCO/OH ratio is greater than 1, as it increases, certain mechanical properties of the layer obtained by reactive pouring are reinforced, for example the layer becomes more rigid. However because of the high cost of the isocyanate component in relation to that of the polyol component, the choice of the NCO/OH ratios at substantially equal to 1 is a good compromise between the properties obtained and the cost.

The amounts of the long polyol and the short diol can vary as a function of the desired properties and also of the ratio of the equivalent groups. The number of equivalent OH groups due to the short diol, however, generally represents from 20 to 70% of the total equivalent groups of the mixture forming the polyol component, when the ratio of the equivalent NCO groups to the OH groups is on the order of 1. When the amount of the short diol is increased, the layer is hardened and its modulus is generally increased.

Suitable diisocyanates used in the framework of the invention are in particular selected from among the following difunctional aliphatic isocyanates: hexamethylenediisocyanate (HMDI), 2,2,4-trimethyl 1,6-hexanediisocyanate (TMDI), bis4-isocyanatocyclohexylmethane (Hylene W), bis3-methyl-4-isocyanatocyclohexylmethane, 2,2 bis(4-isocyanatocyclohexyl) propane, 3-isocyanatomethyl-3,5,5-trimethylcyclohexylisocyanate (IPDI), m-xylylenediisocyanate (XDI), m- and p-tetramethylxylylenediisocyanate (m- and p-TMXDI), cis-and trans-1,4-cyclohexane diisocyanate (CHDI), 1,3-(diisocyanatomethyl) cyclohexane (hydrogenated XDI).

An isocyanate component containing urea functions can be used. These urea functions improve certain mechanical properties of the layer. The amount of urea can represent up to approximately 10% of the total weight of the isocyanate component with urea functions and preferably between 5 and 7% of the total weight of the component. For the reason mentioned above, 3-isocyanatomethyl-3,5,5 trimethylcyclohexyldiisocyanate containing urea functions (IPDI and derivatives) is preferably used.

Suitable long polyols are selected from among polyetherdiols or polyesterdiols with a molecular weight of 500–4000; the polyesterdiols are the esterification products of a diacid, such as adipic acid, succinic acid, palmitic acid, azelaic acid, sebacic acid or phthalic acid, and a diol such as ethyleneglycol, 1,3-propanediol, 1,4-butanediol, 1,6-hexanediol, polyetherdiols having the general formula $HO(CH_2)_{nm}OH$, where $n=2$ to 6; m is such that the molecular weight is situated in the range of 500–4000 or polyetherdiols having the general formula

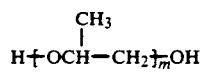

with m such that the molecular weight is also situated in the range of 500–4000. Polycaprolactonediols can also be used.

A polytetramethylene glycol ($n=4$) with a molecular weight of 1000 is preferably used.

Suitable chain extending agents are short diols with a molecular weight of less than approximately 300 and preferably less than 150, such as: ethyleneglycol, 1,2-propanediol, 1,3-propanediol, 1,2-, 1,3- or 1,4-butanediol, 2,2-dimethyl 1,3-propanediol (neopentylglycol), 1,5-pentanediol, 1,6-hexanediol, 1,8-octanediol, 1,10-decanediol, 1,12-dodecanediol, cyclohexanedimethanol, bisphenol A, 2-methyl-2,4-pentanediol, 3-methyl-2,4-pentanediol, 2-ethyl-1,3-hexanediol, 2,2,4-trimethyl-1,3-pentanediol, diethyleneglycol, triethyleneglycol, tetraethyleneglycol, 2-butyne-1,4-diol, 1,4-butenediol and decynediol, which may be substituted and/or esterified, hydroquinone-bis-hydroxyethylether, bisphenol A esterified with two or four groups of propylene oxide, or dimethylolpropionic acid. In general the shorter the diol, the harder the layer.

1,4-butanediol is preferably used, and is a good compromise for obtaining a layer which is neither too hard nor too flexible, as is desirable for this type of application as an energy-absorber.

The polyol component can contain a small amount of at least one polyol with a functionality of greater than 2 and, in particular, monomeric aliphatic triols, such as glycerol, trimethylolpropane, triols with polyether chains, polycaprolactone triols, with the molecular weight of said triols being generally between 90 and 1000, or mixed polyether/polyester polyols with a functionality of greater than 2, for example a functionality of between 2 and 3. The addition of a polyol with a functionality of greater than 2 causes additional bridging bonds between the polyurethane chains and can thus further improve the cohesion of the layer.

The amounts of the long polyol, the short diol and possibly the polyol with a functionality of greater than 2 can vary depending on the desired properties. Amounts are generally selected such that, for a hydroxyl equivalent, the long polyol represents approximately from 0.30 to 0.45 equivalent, the short diol approximately 0.2 to 0.7 equivalent and the polyol with a functionality of greater than 2 approximately 0 to 0.35 equivalent.

The layer can also be produced by replacing part of the polyol component by a product with different active hydrogens, such as an amine.

In accordance with one embodiment of the plastic layer, the isocyanate component can contain limited amounts, for example less than approximately 15% in NCO equivalent, of at least one triisocyanate, such as an isocyanate or a triisocyanurate biuret.

In accordance with one embodiment of the method in accordance with the invention, it is applied onto the sheet formed by the single layer described above.

In an alternative embodiment, the method in accordance with the invention is applied onto the layer described above while is it combined with a layer of auto-cicatrizing plastic, i.e., one which is resistant to scratching and abrasion and which, preferably, can be polymerized in a catalytic atmosphere.

The auto-cicatrizable, scratch resistant plastic layer may be, for example, the one described in French Patents 2,187,719 or 2,251,608. Under normal temperature conditions, this auto-cicatrizing layer has a high capacity for resilient deformation, a low modulus of elasticity, less than 2000 daN/cm$^2$ and preferably less than 200 daN/cm$^2$, and stretching to breakage of more than 60% with less than 2% plastic deformation, and preferably stretching to breakage of more than 100% with less than 1% plastic deformation. The preferred layers of this type are heat-hardenable polyurethanes having a modulus of elasticity of approximately 25 to 200 daN/cm$^2$ and stretching of approximately 100 to 200% with less than 1% plastic deformation.

Examples of monomers which are suitable for the preparation of these heat-hardenable polyurethanes are, on the one hand, difunctional aliphatic isocyanates, such as 1,6-hexanediisocyanate, 2,2,4-trimethyl-1,6-hexanediisocyanate, 2,4,4-trimethyl-1,6-hexanediisocyanate, 1,3-bis(isocyanatomethyl) benzene, bis(4-isocyanatocyclohexyl) methane, bis(3-methyl-4-isocyanatocyclohexyl) methane, 2,2-bis(4-isocyanatocyclohexyl) propane and 3-isocyanatomethyl-3,5,5-trimethylcyclohexylisocyanate. As well the biurets, isocyanurates and prepolymers of said compounds having a functionality of 3 or more, and, polyfunctional polyols, such as branched polyols like the polyesterpolyols and polyetherpolyols obtained by reaction of polyfunctional alcohols, in particular 1,2,3-propanetriol (glycerol), 2,2-bis(hydroxymethyl)-1-propanol (trimethylolethane), 2,2-bis(hydroxymethyl)-1-butanol (trimethylolpropane), 1,2,4-butanetriol, 1,2,6-hexane-triol, 2,2-bis(hydroxymethyl)-1,3-propanediol (pentaerythritol) and 1,2,3,4,5,6-hexane-hexol (sorbitol), with aliphatic diacids such as malonic acid, succinic acid, glutaric acid, adipic acid, suberic acid and sebacic acid or with cyclic ethers such as ethylene oxide, 1,2-propylene oxide and tetrahydrofuran may also be used.

The molecular weight of the branched polyols is advantageously approximately 250 to 4000 and preferably approximately 450 to 2000. Mixtures of different monomeric polyisocyanates and polyols can be used. Particularly preferred heat-hardenable polyurethanes are those described in French Patent 2,251,608 and European Patents 0 190 517 or 0 133 090.

In accordance with one characteristic of the invention, the auto-cicatrizable layer, when it is formed from a heat-hardenable polyurethane, is also obtained by passage of the layer through a catalytic atmosphere of a tertiary amine so as to accelerate its polymerization, whether the layer is combined subsequently with an EA layer as described above or whether it is manufactured alone by reactive pouring or spraying.

The polyurethane layer capable of being polymerized in accordance with the invention can have a thickness of up to approximately 1 mm.

The invention also relates to a device for carrying out the method of manufacture of at least one polyurethane layer.

This device comprises a support for the reactive pouring or spraying, means for supplying the reaction mixture capable of forming the layer on said support, and a polymerization tunnel provided with a catalytic atmosphere containing a tertiary amine through which the support moves. In accordance with one of the characteristics of the device, the polymerization tunnel is placed just downstream from the reaction mixture supply means. In an alternative embodiment, the reaction mixture supply means are placed in a chamber containing the same catalytic atmosphere as in the polymerization tunnel.

Other advantages and characteristics of the invention will become apparent from the description in the following examples:

EXAMPLES 1 TO 5

To manufacture a polyurethane layer having energy-absorbing properties which can be used in safety glazings, a polyol component was prepared in advance by mixing a polytetramethyleneglycol having a molecular weight of 1000 with 1,4-butanediol. The amounts of the two components were such that the polytetramethyleneglycol provided 0.37 equivalent in hydroxyl groups while the 1,4-butanediol provided 0.63.

A stabilizing agent, 0.5% by weight of the total amount of the polyol component and the isocyanate component; a sheeting agent, at 0.05% by weight calculated in the same manner; and a catalyst, in this case dibutyltin dilaurate, at 0.01% by weight calculated in the same manner as above, were incorporated into the polyol component.

The isocyanate component used was 3-isocyanatomethyl-3,5,5 trimethylcyclohexylisocyanate (IPDI) with urea functions obtained by partial hydrolysis of the IPDI and with a content of NCO groups of approximately 31.5% by weight.

The components were used in quantities such that the NCO/OH ratio was 1.

After vacuum degassing of the components, the mixture, brought to approximately 40° C., was poured, using a pouring head such as the one described in French Patent Publication 2,347,170, onto a support coated with a separation agent. In this manner, a layer of a thickness of approximately 0.5 mm was formed, which was subjected to a polymerization cycle.

This cycle consisted of bringing the layer to a temperature of 120° C. for 19 minutes and of introducing the layer during at least part of that time into a catalytic atmosphere of triethylamine. Table 1 indicates the amounts of NCO measured for varing concentrations of amine catalyst when the layer was introduced into the catalytic atmosphere, with different times starting from time to corresponding to the addition of the reaction mixture onto the support.

REFERENCE EXAMPLE 1

In this Reference Example 1, the above method was used, except that only a heat polymerization cycle was used.

EXAMPLES 6 AND 7

The same method as used in the preceding examples was repeated, except that the tin catalyst contained in the reaction mixture was not included and triethylamine was incorporated into said mixture at a rate of 2.5% by weight of the weight of the polyurethane to be manufactured.

In Example 6 which was not in accordance with the invention, the polymerization took place in free air and the part of the amine which was released could not form a catalytic atmosphere.

In Example 7, the polymerization took place in a tunnel and the part of the amine which was released from the layer mixed with the air to form a catalytic atmosphere.

|  | t °C. | Concentration of Et$_3$N | Amount of NCO Measured | | | | |
|---|---|---|---|---|---|---|---|
|  |  |  | 0 T | +5 (min) | +10 (min) | +13 (min) | +19 (min) |
| Ref. Ex. 1 | 120 | 0 | 10.5 | 5 | 1.45 | 1.20 | 0.77 |
| Example 1 | 120 | 0.3% | 10.5 |  | Introd in Et$_3$N |  | 0.5 |
| Example 2 | 120 | 18.6% | 10.5 |  | Introd in Et$_3$N |  | 0.2 |
| Example 3 | 120 | 18.6% | 10.5 | Introd in Et$_3$N |  |  | 0.1 |
| Example 4 | 120 | 18.6% | Introd in Et$_3$N | 2 |  | 0 | 0 |
| Example 5 | 65 | 18.6% | 10.5 |  | Introd in Et$_3$N |  | 2 |
| Example 6 | 120 | * |  |  |  |  | 3.3 |
| Example 7 | 120 | * |  |  |  |  | 0.75 |

* Et$_3$N in the poured mixture 2.5% weight of the polyurethane

The amount of NCO corresponds to the weight of the NCO groups in relation to the total weight of the layer.

The concentration of Et$_3$N is the concentration expressed by volume of the amine in relation to the total volume of the catalytic atmosphere.

The examples show that the polymerization becomes more advanced as the length of time of the catalysis in the gaseous phase is increased. It also becomes more rapid as the concentration of the catalyst in the atmosphere is increased. Further, it is necessary to work at a temperature above approximately 80° C.

EXAMPLES 8 TO 10

The same method as used in the preceding Examples 2, 3 and 4 was repeated, except that the EA layer was formed from a different polyol component. The polyol component in this case was prepared by mixing a polytetramethyleneglycol with a molecular weight of 1000 with 1,4-butanediol and polycaprolactonetriol with a molecular weight of 300. The amounts of the three components were such that the polytetramethyleneglycol provided 0.35 equivalent of hydroxyl groups, the 1,4butanediol provided 0.55 and the polycaprolactonetriol provided 0.1.

The results obtained using polymerization in a catalytic atmosphere were similar to those obtained in the preceding examples.

The polymerization in a catalytic atmosphere in accordance with the invention therefore enabled the speed of polymerization to be accelerated and the length of the manufacturing line to be reduced. Example 4 showed that 13 minutes were sufficient to fully polymerize a layer of a thickness of 0.5 mm.

The layer obtained can subsequently be treated using water in the liquid or vapor phase. Because of the polymerization in a catalytic atmosphere in accordance with the invention, this treatment can be carried out much sooner in relation to the time to corresponding to the formation of the layer on the support.

What is claimed as new and desired to be secured by Letters Patent of the United States is:

1. A method for manufacturing a high quality optical quality, transparent polyurethane layer which comprises the steps of: reactive pouring or reactive spraying onto a support a reaction mixture containing an isocyanate component selected from the group consisting of hexamethylenediisocyanate, 2,2,4-trimethyl-1-6-hexanediisocyanate, bis(4-isocyanatocylohexyl)methane, bis(3-methyl-4-isocyanatocyclohexyl) methane, 2,2 bis(4-isocyanatocyclohexyl)propane, 3-isocyanatomethyl-3,5,5-trimethylcyclohexylisocyanate, m-xylylenediisocyanate, m- and p-tetramethylxylylenediisocyanate, cis- and trans-1,4-cyclohexane diisocyanate, 1,3-(diisocyanatomethyl)cyclohexane and a polyol component to form a layer of the reaction product thereof on said support, and polymerizing the layer on its support by passing the layer through a catalytic atmosphere containing at least one tertiary amine in the gaseous phase to thereby form a polyurethane layer, wherein said layer is brought to a temperature above 80° C. during said passing through said catalytic atmosphere.

2. The method in accordance with claim 1, wherein the catalytic atmosphere contains an amount of tertiary amine which is greater than 0.5% expressed by volume of amine in the gaseous phase in relation to the total volume of the atmosphere.

3. The method in accordance with claim 1, wherein the passing of the layer through the catalytic atmosphere is carried out at a time between 0 and 15 minutes from the formation of the unreacted layer.

4. The method in accordance with claim 1, wherein the passing of the layer through the catalytic atmosphere takes place directly after the formation of the layer.

5. The method in accordance with claim 3, wherein the formation of the layer takes place in the catalytic atmosphere.

6. The method in accordance with claim 2, wherein the catalytic atmosphere is saturated in tertiary amine.

7. The method in accordance with claim 1, wherein the tertiary amine is selected from the group consisting of triethylamine, methyldiethylamine, dimethylethylamine, and trimethylamine.

8. The method in accordance with claim 1, wherein the tertiary amine is also a substituted amine.

9. The method in accordance with claim 1, wherein the reaction mixture contains a catalyst.

10. The method in accordance with claim 9, wherein the the catalyst is a tin catalyst.

11. The method in accordance with claim 9, wherein the catalyst is a tertiary amine capable of evaporating to form the catalytic atmosphere for the polymerization.

12. The method in accordance with claim 1, further comprising treating the polyurethane layer with water in liquid or vapor form.

13. The method in accordance with claim 1, wherein the reactive pouring or reactive spraying of the reaction mixture is controlled to form the layer with a thickness of greater than 0.1 mm.

14. The method of claim 1, wherein the aliphatic isocyanate component and the polyol component are present in such proportions that the unreacted layer has an NCO-functional group to OH-functional group ratio is greater than or equal to 0.8.

15. The method of claim 1, wherein said layer is brought to a temperature of 120° C. during said passing through said catalytic atmosphere.

* * * * *